United States Patent
Chachmon et al.

(10) Patent No.: US 10,938,724 B2
(45) Date of Patent: Mar. 2, 2021

(54) FLOW RATE BASED NETWORK LOAD BALANCING

(71) Applicant: Cisco Technology, Inc., San Jose, CA (US)

(72) Inventors: Nadav Tsvi Chachmon, Moshav Yaad (IL); Ofer Iny, Tel Aviv (IL); Aviran Kadosh, D.N. Misgav (IL)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 16/042,334

(22) Filed: Jul. 23, 2018

(65) Prior Publication Data

US 2020/0028786 A1     Jan. 23, 2020

(51) Int. Cl.
| | |
|---|---|
| *H04L 12/701* | (2013.01) |
| *H04L 12/721* | (2013.01) |
| *H04L 12/729* | (2013.01) |
| *H04L 12/803* | (2013.01) |
| *H04L 12/851* | (2013.01) |
| *H04L 12/707* | (2013.01) |
| *H04L 12/26* | (2006.01) |

(52) U.S. Cl.
CPC ........ *H04L 47/125* (2013.01); *H04L 43/0894* (2013.01); *H04L 45/124* (2013.01); *H04L 45/22* (2013.01); *H04L 47/2483* (2013.01)

(58) Field of Classification Search
None
See application file for complete search history.

(56) References Cited

U.S. PATENT DOCUMENTS

| | | | | |
|---|---|---|---|---|
| 6,594,268 B1* | 7/2003 | Aukia | ..................... | H04L 45/04 370/230 |
| 6,671,279 B1* | 12/2003 | Mangin | ............... | H04L 12/5601 370/395.5 |
| 7,295,516 B1* | 11/2007 | Ye | ........................... | H04L 47/10 370/232 |
| 8,300,524 B1* | 10/2012 | Carson | ................ | H04L 63/1425 370/230 |

(Continued)

OTHER PUBLICATIONS

Mahapatra, et al., "Load Balancing Mechanisms in Data Center Networks," CEWIT 2010 : The 7th International Conference and Expo on Emerging Technologies for a Smarter World, Sep. 2010, 6 pages.

(Continued)

*Primary Examiner* — Duc T Duong
(74) *Attorney, Agent, or Firm* — Edell, Shapiro & Finnan, LLC (57) ABSTRACT

Techniques for flow rate based load balancing are described. In one embodiment, a method includes receiving a packet associated with a packet flow at an ingress top-of-rack switch in a spine-leaf network. The method includes determining identification information for the packet flow, including a source and a destination. Based on the identification information, the method includes determining an instantaneous flow rate for a first path through the network from the source to the destination. The method also includes comparing the instantaneous flow rate to an average flow rate. Based on the comparison between the instantaneous flow rate to the average flow rate, the method includes assigning the packet flow to one of the first path or a second path.

20 Claims, 7 Drawing Sheets

(56) References Cited

U.S. PATENT DOCUMENTS

| | | | |
|---|---|---|---|
| 10,069,734 B1* | 9/2018 | Singh | H04L 47/12 |
| 10,187,274 B1* | 1/2019 | R. | H04L 43/062 |
| 10,243,789 B1* | 3/2019 | Naylor | H04L 63/02 |
| 10,505,849 B1 | 12/2019 | Iny et al. | |
| 2009/0193105 A1 | 7/2009 | Charny et al. | |
| 2013/0155865 A1* | 6/2013 | Xu | H04L 43/0894 |
| | | | 370/237 |
| 2014/0029437 A1* | 1/2014 | Kurita | H04L 47/122 |
| | | | 370/237 |
| 2014/0112128 A1* | 4/2014 | Kwan | H04L 47/12 |
| | | | 370/230 |
| 2014/0161450 A1* | 6/2014 | Graves | H04Q 11/0005 |
| | | | 398/51 |
| 2014/0376373 A1 | 12/2014 | Deshpande | |
| 2015/0180769 A1* | 6/2015 | Wang | H04L 45/38 |
| | | | 370/236 |
| 2015/0215236 A1* | 7/2015 | Joshi | G06F 16/2255 |
| | | | 707/754 |
| 2016/0142269 A1* | 5/2016 | Konduru | H04L 43/026 |
| | | | 709/224 |
| 2016/0373292 A1* | 12/2016 | Sigoure | H04L 41/0856 |
| 2017/0187629 A1* | 6/2017 | Shalev | H04L 43/0852 |
| 2017/0223572 A1* | 8/2017 | Lee | H04W 28/08 |
| 2017/0346731 A1* | 11/2017 | Pukhraj Jain | H04L 12/4633 |
| 2018/0089053 A1* | 3/2018 | Chen | H04L 49/50 |
| 2018/0287932 A1* | 10/2018 | Viquez Calderon | |
| | | | H04L 45/745 |
| 2018/0375767 A1* | 12/2018 | Li | H04L 45/42 |
| 2019/0173793 A1* | 6/2019 | Liu | H04L 47/12 |
| 2020/0007388 A1* | 1/2020 | Johnston | H04L 45/306 |

OTHER PUBLICATIONS

Alizadeh, Mohammad et al., "CONGA: Distributed Congestion-Aware Load Balancing for Datacenters", SIGCOMM'14, Aug. 17-22, 2014, http://dx.doi.org/10.1145/2619239.2626316, 12 pages.

* cited by examiner

FLOW RATE BASED NETWORK LOAD BALANCING

TECHNICAL FIELD

This disclosure relates generally to load balancing in a network.

BACKGROUND

When a network device such as a switch or router receives a packet, the network device transmits the packet to a destination to which the packet is addressed. Often, the network device will have two or more possible paths via which the network device may transmit the packet. Each incoming packet at a network device is sent to an output path, with the choice of output path made based on information at the network device. Data traffic is generally forwarded along a single path from a source host to a target host based on an optimum route, such as a best or shortest route. However, there are certain cases where two or more best paths (e.g., equal cost paths) are available. In these instances, the network device will attempt to implement load-balancing, in which the traffic load is shared equally between the paths. All packets associated with a given flow will be transmitted via the same path.

DESCRIPTION OF EXAMPLE EMBODIMENTS

Overview

Presented herein are techniques for flow rate based load balancing in a spine-leaf network. In an example embodiment, a method includes receiving a packet associated with a packet flow at an ingress top-of-rack switch in a spine-leaf network. The method includes determining, from the received packet, identification information for the packet flow. The identification information includes at least a source and a destination associated with the packet flow. Based on the identification information, the method further includes determining an instantaneous flow rate for a first path through the spine-leaf network from the source to the destination. The instantaneous flow rate is determined over a first time period. The method also includes comparing the instantaneous flow rate for the first path to an average flow rate. Based on the comparison between the instantaneous flow rate to the average flow rate, the method includes assigning the packet flow to one of the first path or a second path, wherein the second path is different than the first path.

Example Embodiments

A data center fabric refers to a network that is used to interconnect a plurality of servers or hosts within a data center. A data center environment may include a large number (many thousands or more) of interconnected servers/hosts that use a high interconnect bandwidth (e.g., 40 Gbps or greater). One common data center fabric implementation is a spine-leaf network architecture with a CLOS interconnect topology. In this configuration, leaf switches are referred to as top-of-rack (TOR) switches. The spine switching layer is one layer or multiple layers, as needed, to support the overall capacity (i.e., the number of interconnected TOR switches).

The CLOS topology, as well as other data center fabric topologies, include many paths between any pair of TOR switches. Efficient use of all of the paths provides good performance. In the context of a spine-leaf network configuration, load balancing refers to how traffic is sent across the spine interconnect between TOR switches.

In packet switching networks, a "traffic flow" (also referred to as a "packet flow") is a sequence or set of packets between a source node and a destination node which share common characteristics and/or identifiers. For example, a packet flow may include all packets sent during a particular connection, session, media stream, etc. As another example, RFC 2722 "Traffic Flow Measurement: Architecture" authored by Brownlee, et al. describes traffic flows as artificial logical equivalents to a call or connection and elaborates on techniques for identifying and measuring traffic flows.

Data center fabric solutions, such as spine-leaf network architectures, involve complex routing and load balancing algorithms to send a packet from one node to another in the data center fabric. In fabrics using dynamic load balancing schemes, the same packet flow can take a different path at different times based on the bandwidth it consumes. In addition, efficient load balancing schemes may use multiple paths for the same packet flow.

From the perspective of a particular packet, an ingress TOR switch refers to the TOR switch where a packet is received from a source host and an egress TOR switch refers to the TOR switch where the packet is transmitted to the target host. A path that a packet takes through the data center fabric is determined by forwarding decisions made by every node in the packet's path. When a particular node's forwarding decision includes a choice between multiple options, load balancing considerations may be applied. In a CLOS topology, assigning a packet flow to a path refers to an ingress TOR switch assigning the packet flow to one outgoing port (i.e., towards a spine switch) selected from a set of possible ports. The spine switch receiving the flow may then assign the flow to an outgoing port from its set of possible ports.

Ingress TOR switch load balancing decisions can rely on locally measured metrics, such as congestion levels for ingress TOR switch ports, as well as globally (i.e., network-level) measured metrics, such as congestion levels for spine switch ports and/or egress TOR switch ports. While the locally measured metrics are available for the ingress TOR switch, the globally measured metrics require a network-level feedback mechanism to be available for the ingress TOR switch. This network-level feedback mechanism should be able to identify congestion and notify the ingress TOR switch about such congestion as soon as possible.

However, identifying network-level congestion requires a specific dedicated mechanism (e.g., measuring network-level bandwidth bottlenecks by embedding available bandwidth data on a per-device basis into a flow's packets) or uses existing congestion assessment mechanisms (e.g., Explicit Congestion Notification (ECN) flag state, Transmission Control Protocol (TCP) ACK packets, packet drops, etc.). According to the principles of the embodiments described herein, techniques for flow rate based load balancing in a spine-leaf network are provided that identify congestion and notify the ingress TOR switch as soon as possible, while introducing minimal network-level modifications and/or new mechanisms. In addition, the techniques presented herein do not rely on any one specific feedback mechanism to allow for flow rate based load balancing.

Figure 1:
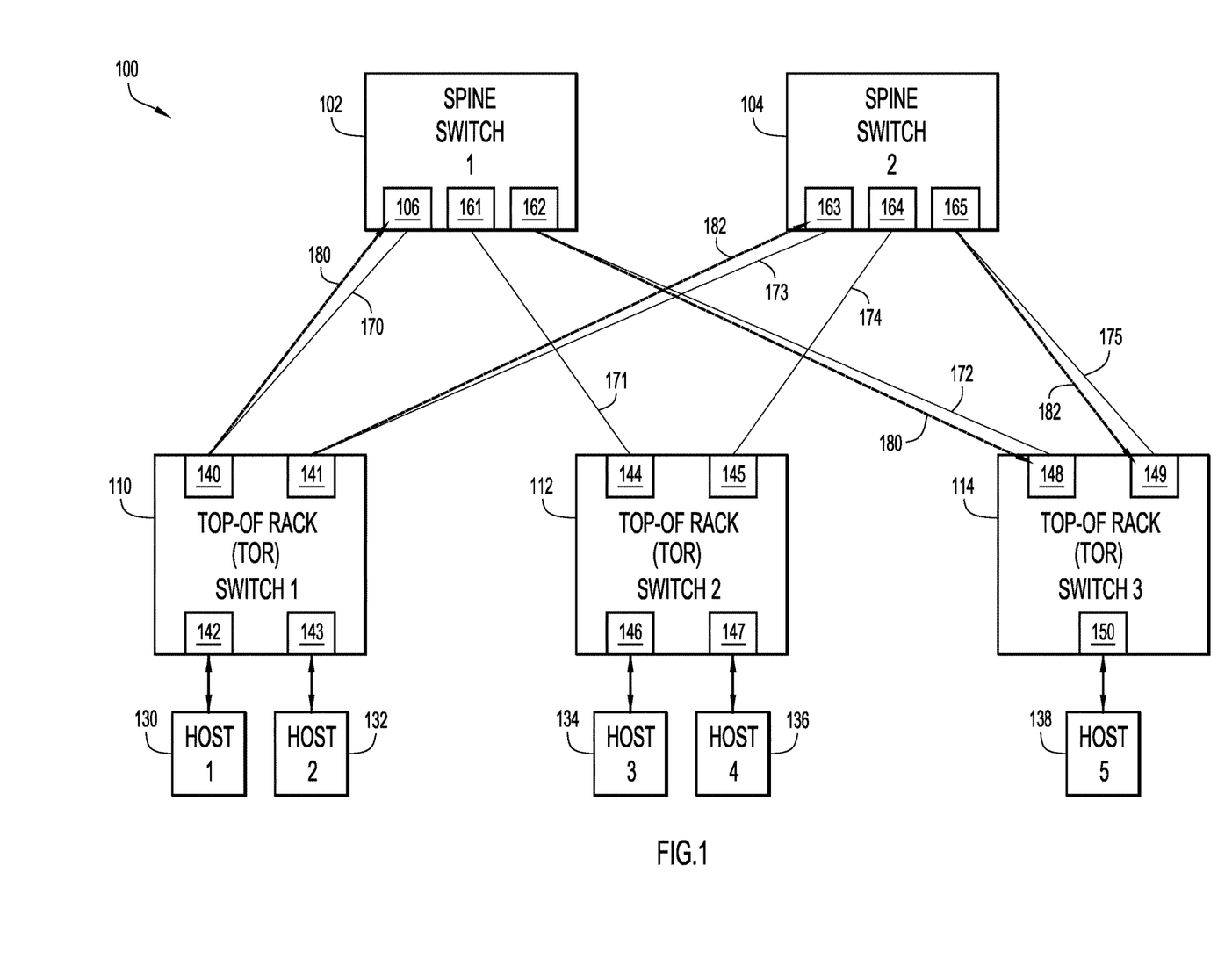
FIG. 1 is a block diagram illustrating a scenario in a network in which techniques for flow rate based load balancing may be implemented, according to an example embodiment.

FIG. 1 is a block diagram illustrating a spine-leaf network 100 in which techniques for flow rate based load balancing may be implemented according to an example embodiment. Network 100 may be a computer network, or a part of a network, having a spine-leaf topology. Network 100 includes a plurality of spine switches, including a first spine switch 102 and a second spine switch 104, and a plurality of leaf switches, including a first leaf switch 110, a second leaf switch 112, and a third leaf switch 114. In this embodiment, each leaf switch 110, 112, 114 is a TOR switch. For example, each TOR switch, including first TOR switch 110, a second TOR switch 112, and third TOR switch 114, may be located in a rack unit that houses one or more network elements or hosts, such as physical servers. Each TOR switch is configured to route communications between physical servers or hosts in the rack unit and other network elements in network 100.

In example embodiments, each TOR switch may be connected to one or more hosts. For example, in this embodiment, first TOR switch 110 is connected to a first host 130 and a second host 132, second TOR switch 112 is connected to a third host 134 and a fourth host 136, and third TOR switch 114 is connected to a fifth host 138. While five hosts are illustrated in FIG. 1 for the purposes of this embodiment, it should be understood that in a network, such as network 100, TOR switches may be connected to a large number of hosts in each rack.

Each of spine switches 102, 104, and TOR switches 110, 112, 114 include a plurality of network ports to allow communication with other switches, hosts, and/or devices in network 100. For example, in this embodiment, first TOR switch 110 includes a first port 140 connected to a first port 160 of first spine switch 102, a second port 141 connected to a first port 163 of second spine switch 104. First TOR switch 110 also includes a third port 142 connected to first host 130 and a fourth port 143 connected to second host 132. Second TOR switch 112 includes a first port 144 connected to a second port 161 of first spine switch 102, a second port 145 connected to a second port 164 of second spine switch 104, a third port 146 connected to third host 134, and a fourth port 147 connected to fourth host 136. Third TOR switch 114 includes a first port 148 connected to a third port 162 of first spine switch 102, a second port 149 connected to a third port 165 of second spine switch 104, and a third port 150 connected to fifth host 138.

The ports connecting TOR switches 120, 122, 124 to spine switches 102, 104 may be referred to as outgoing ports (i.e., first port 140, second port 141 of first TOR switch 110; first port 144, second port 145 of second TOR switch 112; and first port 148, second port 149 of third TOR switch 114), for example, when an ingress TOR switch is assigning a packet flow to a path according to a particular outgoing port.

In this embodiment, network 100 has a spine-leaf topology, with each spine switch 102, 104 having a link to each leaf/TOR switch 120, 122, 124. For example, first spine switch 102 is connected to first TOR switch 110 over a first link 170, and is also connected to second TOR switch 122 over a second link 171 and to third TOR switch 124 over a third link 172. Similarly, second spine switch 104 is connected to first TOR switch 120 over a fourth link 173, and is also connected to second TOR switch 122 over a fifth link 174 and to third TOR switch 124 over a sixth link 175. Connections between spine switches 102, 104, and leaf/TOR switches 120, 122, 124, via links 170-175, may be made between respective ports 140, 141, 144, 145, 148, 149, 160, 161, 162, 163, 164, 165, described above.

In various embodiments, hosts 130, 132, 134, 136, 138 of network 100 may be network elements or endpoints of any of a variety of types, such as servers, switches, data storage devices, routers, gateways, as well as networking appliances, such as firewalls, intrusion detection systems, etc. The hosts may be physical, virtual (e.g., implemented in software), or a combination of both.

It should be understood that two spine switches 102, 104, three leaf/TOR switches 110, 112, 114, and five host devices 130, 132, 134, 136, 138 are illustrated in this embodiment, however, a network, for example, network 100, may include any number of switches and/or hosts. For example, in one embodiment, network 100 may be a data center and may include hundreds, thousands, or more, switches and/or hosts.

In network 100 with spine-leaf topology, a packet or packet flow can be sent or transmitted from a source host (e.g., one of hosts 130, 132, 134, 136, 138) to another host in network 100 along a path that traverses an ingress TOR switch to a spine switch, then back to an egress TOR switch connected to the target or destination host. For example, second host 132 can send a packet flow to fifth host 138 along a first path 180. In this embodiment, first path 180 starts from first TOR switch 110 to first spine switch 102 via first link 170 (connecting first port 140 of first TOR switch 110 to first port 160 of first spine switch 102), then from first spine switch 102 to third TOR switch 114 (where fifth host 138 is connected) via third link 172 (connecting third port 162 of first spine switch 102 to first port 148 of third TOR switch 114).

According to the principles of the example embodiments described herein, techniques for flow rate based load balancing may be implemented by an ingress TOR switch to determine which path to use for a packet flow. For example, first TOR switch 110 may use flow rate based load balancing to determine whether to assign a packet flow along first path 180 or to a different path, such as a second path 182. As shown in FIG. 1, second path 182 starts from first TOR switch 110 to second spine switch 104 via fourth link 173 (connecting second port 141 of first TOR switch 110 to first port 163 of second spine switch 104), then from second spine switch 104 to third TOR switch 114 (where fifth host 138 is connected) via sixth link 175 (connecting third port 165 of second spine switch 104 to second port 149 of third TOR switch 114).

As will be described in detail further below, the ingress TOR switch (e.g., first TOR switch 110) may make the determination to assign a packet flow to first path 180 or to a different path, such as second path 182, based on a comparison between an instantaneous flow rate to an average flow rate. In one embodiment, the instantaneous flow rate may be compared to an average flow rate associated with first path 180. In other embodiments, the average flow rate may be based on several recent path assignments for one or more traffic flows. Accordingly, when the instantaneous flow rate for first path 180 begins to degrade in comparison to the average flow rate, the ingress TOR switch (e.g., first TOR switch 110) can assign a packet flow to a less congested path, such as second path 182.

Figure 2:
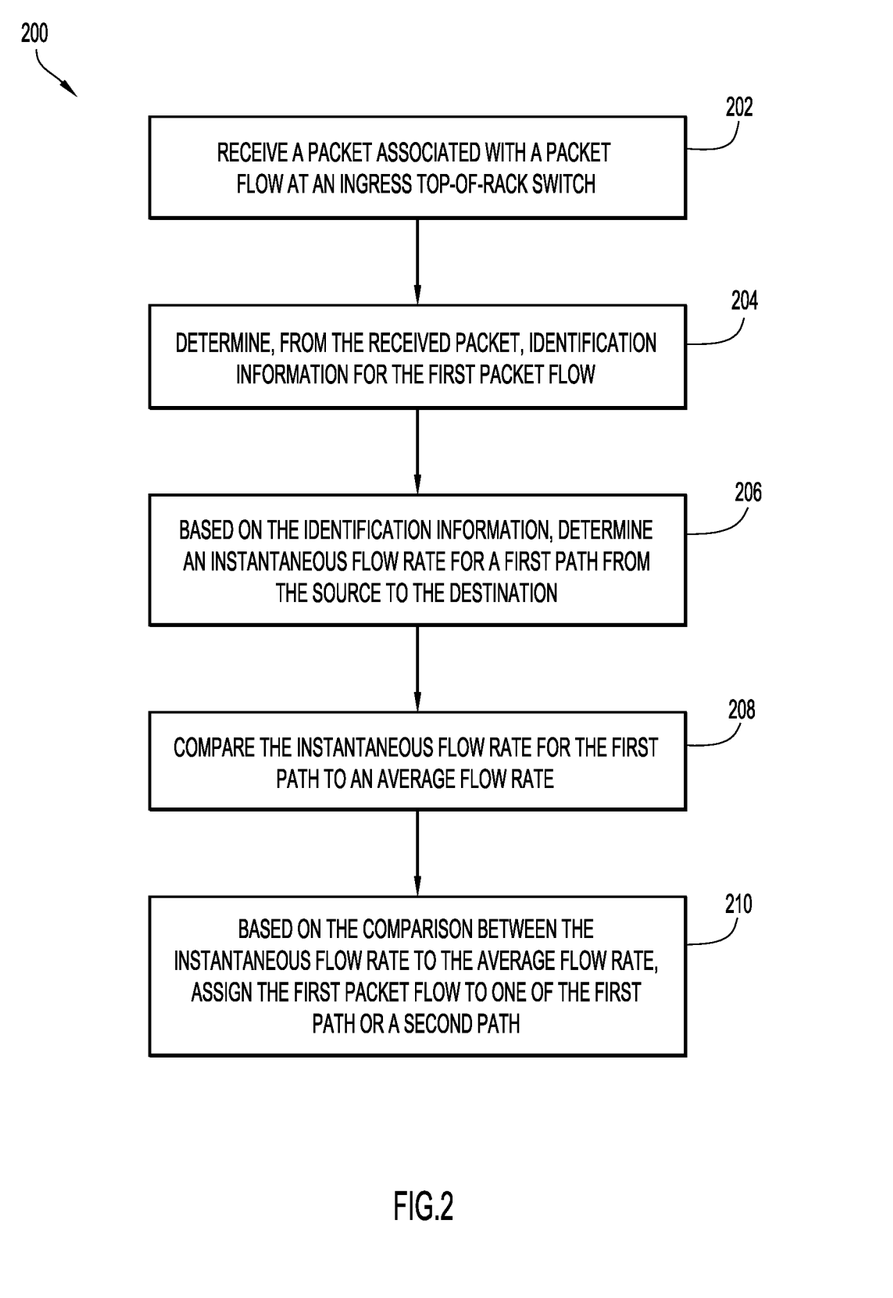
FIG. 2 is a flowchart of a method for implementing techniques for flow rate based load balancing, according to an example embodiment.

FIG. 2 illustrates a flowchart of a method 200 for implementing techniques for flow rate based load balancing according to an example embodiment. In example embodiments, method 200 may be implemented by an ingress TOR switch in a network, for example, first TOR switch 110 in network 100. In this embodiment, method 200 may begin with an operation 202 where an ingress TOR switch receives a packet associated with a packet flow. For example, as shown in FIG. 1 above, first TOR switch 110 in network 100 may be an ingress TOR switch for a packet associated with a packet flow from a host, such as second host 132.

Next, at an operation 204, method 200 includes determining, from the packet received at operation 202, identification information for the packet flow. In some embodiments, the identification may include at least a source and a destination for the packet flow. For example, in one embodiment, the identification information may include or be obtained from a 5-tuple, which includes a source Internet Protocol (IP) address, a source port, a destination IP address, a destination port, and the protocol in use. In other embodiments, the identification information may include different data that can be used to identify at least a source and a destination associated with the packet flow.

Based on the identification information obtained at operation 204, method 200 proceeds to an operation 206. At operation 206, the identification information for the packet flow is used to determine an instantaneous flow rate (also referred to as "i-rate") for a first path from the source to the destination. For example, as shown in FIG. 1, first TOR switch 110 may determine an instantaneous flow rate for first path 180 from second host 132 to fifth host 138. In this embodiment, first path 180 is associated with a source (e.g., second host 132) and a destination (e.g., fifth host 138). In addition, first path 180 may also be associated with an outgoing port of first TOR switch 110. In this case, first path 180 is associated with first port 140 of first TOR switch 110.

In an example embodiment, the instantaneous flow rate for a given path (e.g., first path 180) may be calculated as a function of the amount of data sent over time. In other words, the instantaneous flow rate is a determination of how many bytes are transmitted or sent over a given path during a certain time period. In the case of the instantaneous flow rate, the time period associated with the calculation is small, for example, on the order of approximately 100 microseconds. In other example embodiments, the time period over which the instantaneous flow rate is calculated may be larger or smaller.

At an operation 208, the instantaneous flow rate for the first path obtained from operation 206 is compared to an average flow rate (also referred to as "a-rate"), for example, the average flow rate for the first path. In an example embodiment, the average flow rate for a given path (e.g., first path 180) may be calculated as a function of the moving average of an amount of data sent over time. For example, the average flow rate may be an exponential weighted moving average of bytes that are transmitted or sent over a given path during a time period that may span multiple time windows. In an example embodiment, the average flow rate may be determined as an exponential weighted moving average based on the instantaneous flow rate. For example, the average flow rate may be determined according to the equation: a-rate=alpha*i-rate+(1−alpha)*a-rate, where alpha is a number in a range of (0,1). In one embodiment, alpha may be 0.25. Additionally, in some embodiments, the average flow rate may be based on several recent path assignments for one or more traffic flows.

At an operation 210, based on the comparison between the instantaneous flow rate to the average flow rate, the packet flow may be assigned to one of the first path or a second path. For example, first TOR switch 110 may compare the instantaneous flow rate to the average flow rate for first path 180 and use the resulting determination to assign the packet flow to either first path 180 or to second path 182. In an example embodiment, at operation 210, the ingress TOR switch (e.g., first TOR switch 110) may assign the packet flow to the first path (e.g., first path 180) when the comparison between the instantaneous flow rate to the average flow rate indicates that the instantaneous flow rate is greater than or equal to the average flow rate.

Alternatively, at operation 210, the ingress TOR switch (e.g., first TOR switch 110) may instead assign the packet flow to the second path (e.g., second path 182) when the comparison between the instantaneous flow rate to the average flow rate indicates that the instantaneous flow rate is degrading. In other words, when the instantaneous flow rate is less than the average flow rate.

When the instantaneous flow rate is less than the average flow rate, the ingress TOR switch may assume that the path (e.g., first path 180) is becoming congested and may reassign the packet flow to a new path (e.g., second path 182). In some embodiments, a threshold criteria may be used so that the instantaneous flow rate must be less than the average flow rate by a predetermined value before the ingress TOR switch reassigns the packet flow to a new path. For example, the predetermined value may be a percentage or a set amount. Using the threshold criteria before implementing a reassignment of a packet flow to a new path may help mitigate against the possibility that the new path may also be congested. Additionally, in some embodiments, the threshold criteria may be based on a duration or number of times that the instantaneous flow rate is determined to be less than the average flow rate for a given path before reassigning the packet flow to the new path. With this arrangement, the ingress TOR switch is able to verify that the observed degradation is persistent before making the decision to reassign the packet flow, thereby avoiding reassignment for temporary or transient degradations.

The new path assigned to the packet flow may be selected based on locally available metrics, such as congestion information associated with outgoing ports of the ingress TOR switch (e.g., first port 140 and second port 141 of first TOR switch 110). If the degradation persists, the ingress TOR switch may reassign the packet flow to a new path. In the case where there is device-level congestion, the reassignments to different paths may not improve the instantaneous flow rate. However, in such situations, the average flow rate will also become degraded. In other words, the flow rate expectation (i.e., the average flow rate) is dynamically adjusted based on the available flow rate for the current packet flow. Based on this dynamic adjustment, at some point, the instantaneous flow rate will no longer be considered degraded relative to the average flow rate. That is, in the case of device-level congestion where all possible paths are congested, the average flow rate will eventually converge to a lower value that represents the available flow rate, at which point the instantaneous flow rate and the average flow rate will be similar (i.e., i-rate a-rate).

In some embodiments, flow rate information, including instantaneous flow rate and average flow rate for one or more paths through network 100 may be obtained from a flow table database. For example, a flow table database may be stored in memory at each ingress TOR switch, including first TOR switch 110. The flow rate database may be in the form of a table that includes the information associated with each packet flow and corresponding paths assigned to the packet flow. For example, where information associated with the packet flow is obtained from a 5-tuple, the flow rate database may include at least a source IP address, a source port, a destination IP address, a destination port, and protocol associated with a packet flow, as well as information associated with the path assigned to the packet flow, including an outgoing port of the ingress TOR switch for the assigned path, and the instantaneous flow rate for one or more previous packet flows assigned to a given path and the average flow rate for the path.

According to the principles of the example embodiments described herein, techniques for flow rate based load balancing by an ingress TOR switch may be implemented based on congestion control flow rate adjustments initiated by the transport layer and/or application layer. That is, the techniques described herein may be used in conjunction with any suitable congestion control mechanism, including, for example, Explicit Congestion Notification (ECN), Transmission Control Protocol (TCP) ACK clocking/rate, packet drops, or other mechanisms that initiate congestion control flow rate adjustments. Whichever mechanism is used, the ingress TOR switch measures or determines flow rate locally to infer global congestion. Based on the measured local flow rates (e.g., i-rate and a-rate), the ingress TOR switch may load balance packet flows according the techniques described herein. With this configuration, a dedicated feedback mechanism from the egress TOR switch to the ingress TOR switch is not necessary.

Figure 3:
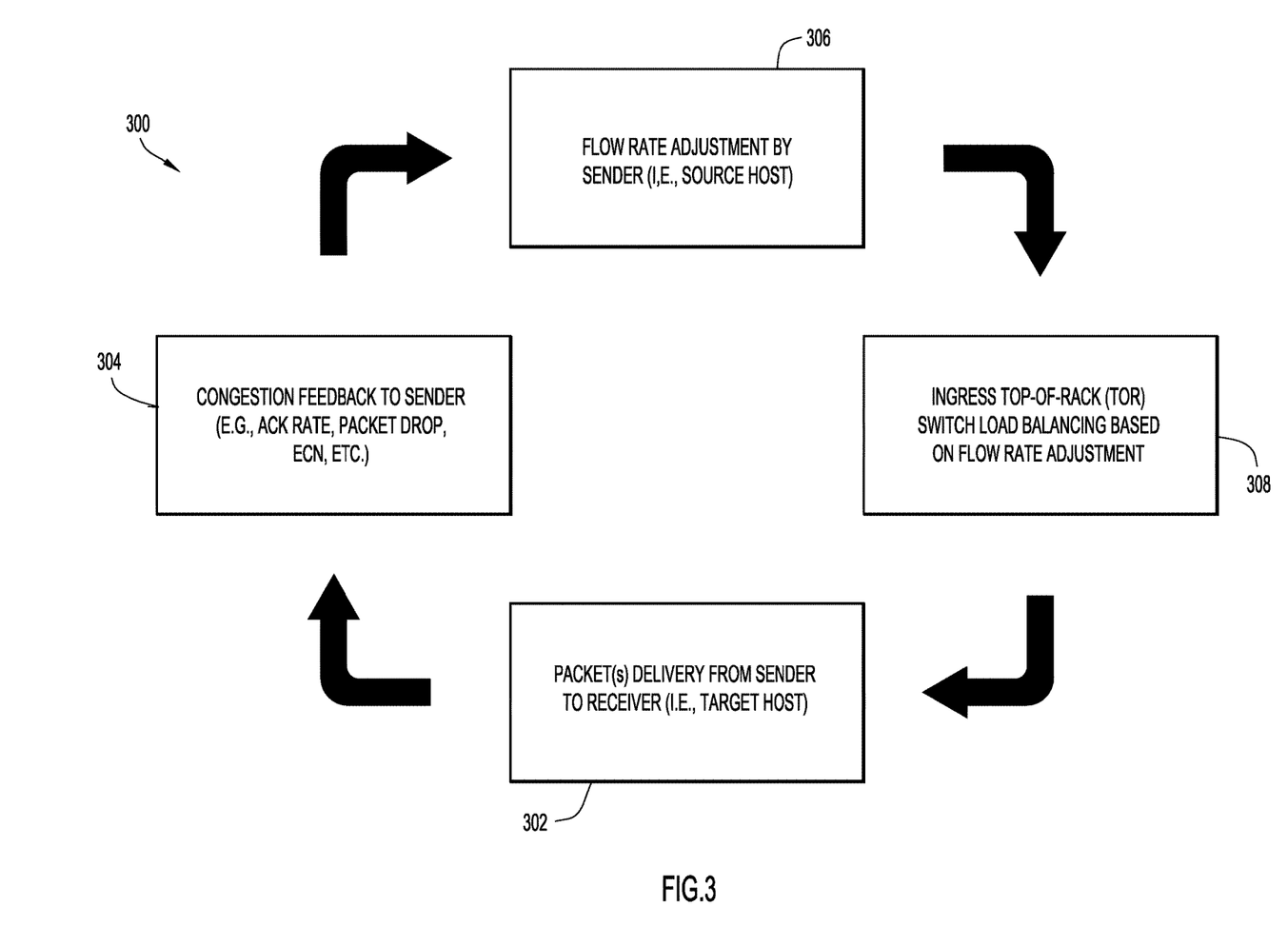
FIG. 3 is a diagram illustrating a flow rate feedback loop in a network, according to an example embodiment.

FIG. 3 illustrates a flow rate feedback loop 300 in a network according to an example embodiment. In a network (e.g., network 100), one or more packets associated with a packet flow are delivered from a sender (i.e., a source host) to a receiver (i.e., a target host) at an operation 302. At an operation 304, congestion feedback is provided to the sender. As described above, this congestion feedback may be provided to the sender according to one or more of various different congestion control mechanisms (e.g., ECN, TCP ACK clocking/rate, packet drops, etc.). Based on this congestion feedback, at an operation 306, the congestion control mechanism may initiate a flow rate adjustment to be made by the sender (i.e., the source host). At operation 308, the ingress TOR switch (e.g., first TOR switch 110) may implement techniques for flow rate based load balancing described herein, for example, in accordance with method 200, based on the flow rate adjustment initiated by the congestion control mechanism at operation 306. Accordingly, flow rate feedback loop 300 may continue and congestion in the network can be mitigated.

Figure 4:
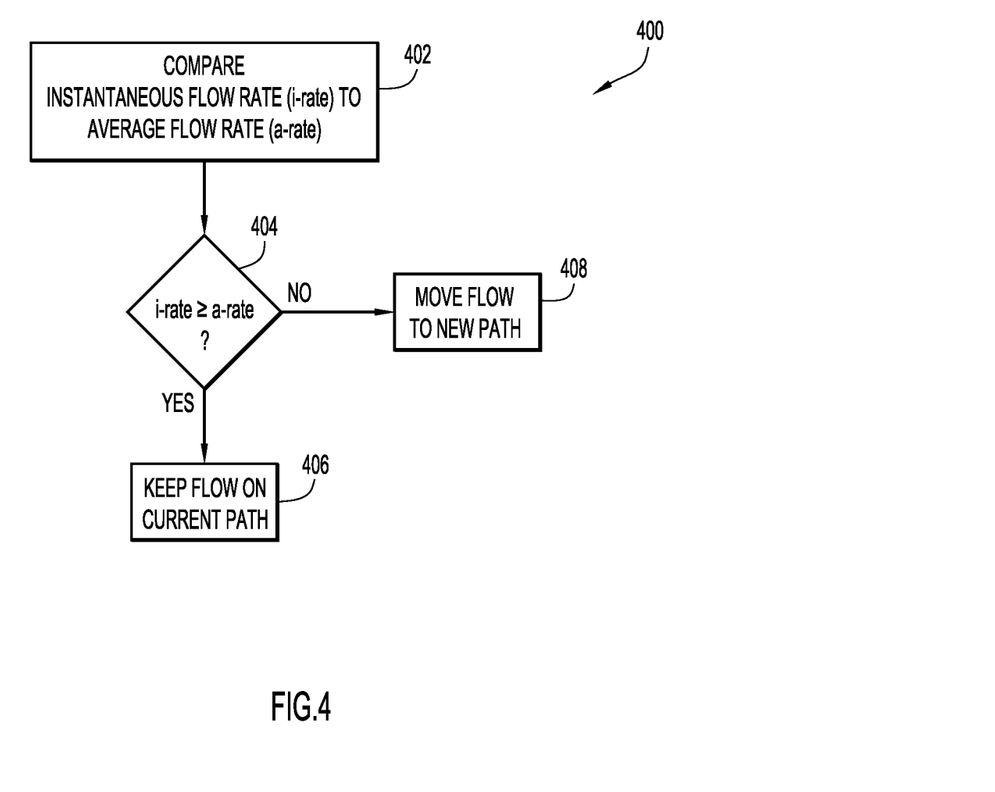
FIG. 4 is a flowchart illustrating techniques for flow rate based load balancing, according to an example embodiment.
Figure 5:
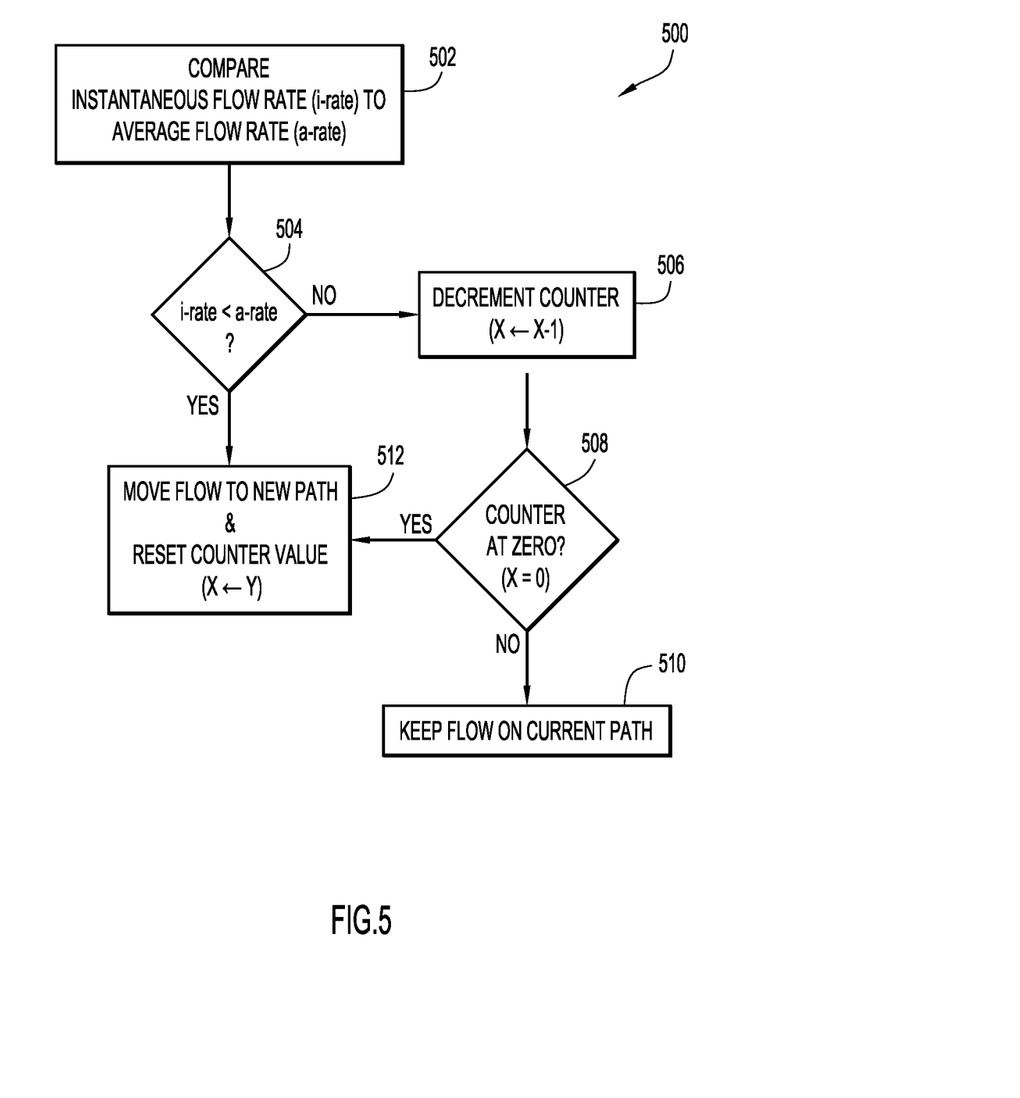
FIG. 5 is a flowchart illustrating techniques for flow rate based load balancing, according to another embodiment.
Figure 6:
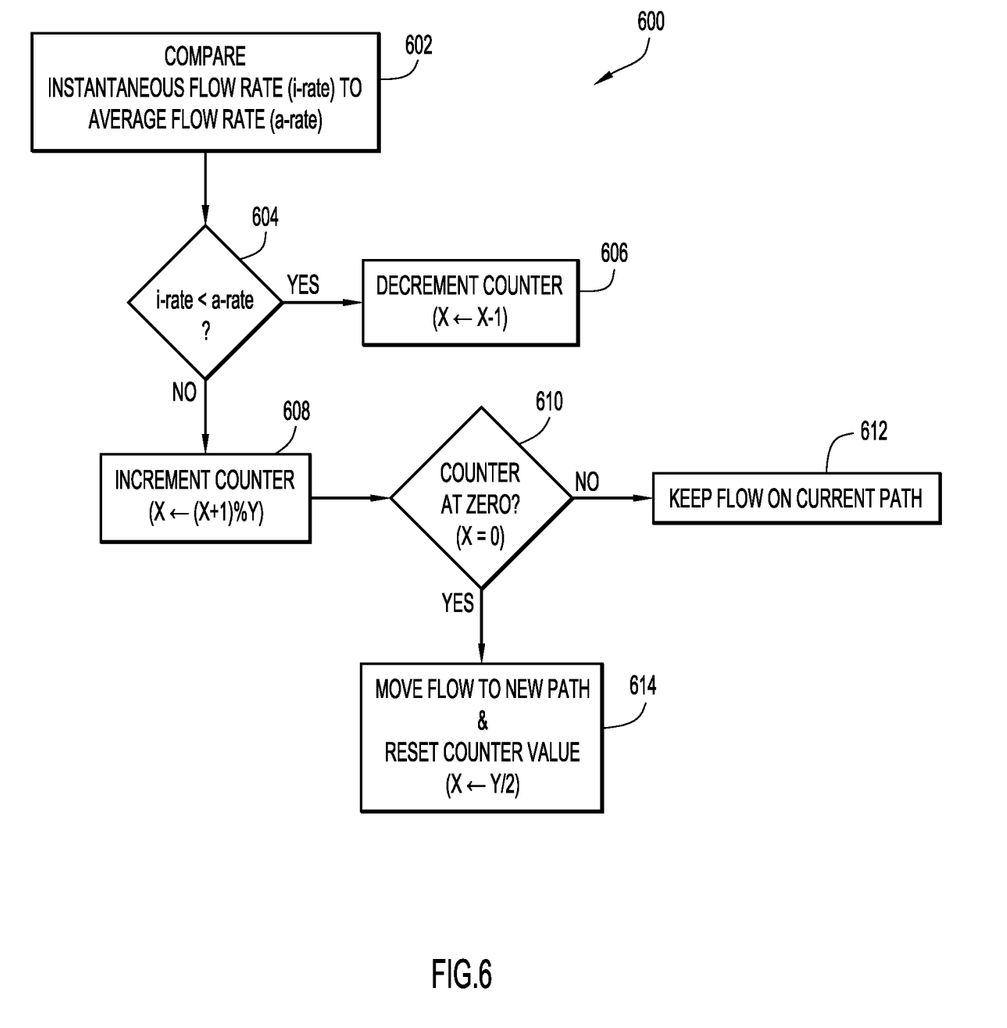
FIG. 6 is a flowchart illustrating techniques for flow rate based load balancing, according to an additional embodiment.

In various embodiments, an ingress TOR switch may use the comparison between the instantaneous flow rate (i-rate) and the average flow rate (a-rate) to make different load balancing choices. For example, in accordance with operation 210 of method 200, which uses the comparison between the instantaneous flow rate and the average flow rate to determine which path to use for a given packet flow. FIGS. 4 through 6 illustrate three example scenarios of flow rate based load balancing decisions that may be implemented by an ingress TOR switch.

Referring first to FIG. 4, in this embodiment, a flowchart illustrates a first technique for flow rate based load balancing according to a method 400. In an example embodiment, method 400 may be used by an ingress TOR switch (e.g., first TOR switch 110) to implement operation 210 of method 200, described above. In this embodiment, method 400 includes an operation 402 where the instantaneous flow rate is compared to the average flow rate for a given path. As described above, the ingress TOR switch may obtain the instantaneous flow rate and the average flow rate from data stored locally at the ingress TOR switch, including, for example, from a flow rate database.

At an operation 404, method 400 includes determining whether the instantaneous flow rate is greater than or equal to the average flow rate. Upon determining at operation 404 that the instantaneous flow rate is greater than or equal to the average flow rate (i.e., the i-rate is not degraded), then, at an operation 406, the ingress TOR switch (e.g., first TOR switch 110) may keep the packet flow assigned to the current path (e.g., first path 180).

Upon determining at operation 404, however, that the instantaneous flow rate is not greater than or equal to the average flow rate (i.e., the i-rate is degraded), then, at an operation 408, the ingress TOR switch (e.g., first TOR switch 110) may instead assign the packet flow to a new path (e.g., second path 182). In an example embodiment, the ingress TOR switch may select a port from the available ports that is associated with a higher available bandwidth. In other words, the ingress TOR switch selects a different outgoing port (e.g., second port 141) for the new path that is less congested than the current outgoing port (e.g., first port 140) associated with the current degraded path.

Referring now to FIG. 5, in this embodiment, a flowchart illustrates a second technique for flow rate based load balancing according to a method 500. In an example embodiment, method 500 may be used by an ingress TOR switch (e.g., first TOR switch 110) to implement operation 210 of method 200, described above. In this embodiment, method 500 includes an operation 502 where the instantaneous flow rate is compared to the average flow rate for a given path. As described above, the ingress TOR switch may obtain the instantaneous flow rate and the average flow rate from data stored locally at the ingress TOR switch, including, for example, from a flow rate database.

At an operation 504, method 500 includes determining whether the instantaneous flow rate is less than the average flow rate. Upon determining at operation 504 that the instantaneous flow rate is not less than the average flow rate (i.e., the i-rate is not degraded), then, at an operation 506 a counter is decremented by one (i.e., current counter value X is previous counter value X−1). Next, method 500 may proceed to an operation 508 that includes determining whether or not the counter has reached a value of zero (i.e., counter value X=0). Upon determining at operation 508 that the counter has not reached zero, then method 500 may proceed to an operation 510 where the ingress TOR switch keeps the packet flow assigned to the current path. That is, at operation 508 because the counter has not yet reached zero, method 500 determines that the instantaneous flow rate is not degrading during a predetermined amount of time (i.e., during Y rate-adjustment time periods), as indicated by the counter value (e.g., an initial counter value may set to a predetermined value, such as X=Y, where Y is a constant value for the number of sampling or rate-adjustment time periods for method 500).

Upon determining at operation 508 that the counter has reached zero (i.e., counter value X=0), then method 500 proceeds to an operation 512. At operation 512, the ingress TOR switch assigns the packet flow to a new path. That is, after the instantaneous flow rate is determined to not be degrading over a predetermined amount of time (i.e., during Y rate-adjustment or sampling time periods), the packet flow is moved to a new path. Additionally, operation 512 may further include resetting the counter value to the initial value (e.g., X=Y, where Y is a constant value, for example, 4). With this arrangement, method 500 allows ingress TOR switch to remain on the current path for a predetermined amount of time (i.e., during Y rate-adjustment time-periods) as long as there is no rate degradation.

While reassigning a packet flow from a path associated with an improving or non-degrading instantaneous flow rate may appear counter intuitive, from a network perspective, this reassignment according to operation 512 of method 500 may allow short-lived packet flows (i.e., mouse flows) that are assigned to the same path find a less congested path to improve their flow completion time. Additionally, the reassignment may also improve the flow rate of the reassigned packet flow, since the flow may be assigned to a new path that is less congested.

Referring back to operation 504, upon determining that the instantaneous flow rate is less than the average flow rate (i.e., the i-rate is degraded), then method 500 may proceed immediately to operation 512. At operation 512, the ingress TOR switch (e.g., first TOR switch 110) assigns the packet flow to a new path (e.g., second path 182). In this case, when the current path is degraded, the result is the same as with method 400 described above.

Referring now to FIG. 6, in this embodiment, a flowchart illustrates a third technique for flow rate based load balancing according to a method 600. In an example embodiment, method 600 may be used by an ingress TOR switch (e.g., first TOR switch 110) to implement operation 210 of method 200, described above. In this embodiment, method 600 includes an operation 602 where the instantaneous flow rate is compared to the average flow rate for a given path. As described above, the ingress TOR switch may obtain the instantaneous flow rate and the average flow rate from data stored locally at the ingress TOR switch, including, for example, from a flow rate database.

At an operation 604, method 600 includes determining whether the instantaneous flow rate is less than the average flow rate. Upon determining at operation 604 that the instantaneous flow rate is less than the average flow rate (i.e., the i-rate is degraded), method 600 may proceed to an operation 606. At operation 606, the ingress TOR switch determines whether the instantaneous flow rate is consistently degrading. For example, operation 606 may include decrementing a counter to determine whether the instantaneous flow rate is consistently degrading. As shown in FIG. 6, at operation 606, a counter is decremented by one (i.e., current counter value X is previous counter value X−1).

Next, at an operation 610, method 600 includes determining whether or not the counter has reached a value of zero (i.e., counter value X=0). Upon determining at operation 610 that the counter has not reached zero, then method 600 may proceed to an operation 612 where the ingress TOR switch keeps the packet flow assigned to the current path. That is, at operation 610 because the counter has not yet reached zero, method 600 determines that the instantaneous flow rate is not yet consistently degrading, i.e., the instantaneous flow rate is not less than the average flow rate more than a predetermined number of times, as indicated by the counter value (e.g., an initial counter value may be set to a predetermined value, such as X=Y/2, where Y is a constant value).

Upon determining at operation 610 that the counter value has reached zero, then method 600 proceeds to an operation 614. That is, the counter value reaching zero at operation 610 indicates that the instantaneous flow rate is consistently degrading, i.e., the instantaneous flow rate is less than the average flow rate more than the predetermined number of times, as represented by the counter. In this case, method 600 proceeds to an operation 614 where the ingress TOR switch assigns the packet flow to a new path. Additionally, operation 614 may further include resetting the counter value to the initial value (e.g., X=Y/2, where Y is a constant value, for example, 8). With this arrangement, method 600 allows ingress TOR switch to verify that the observed degradation is persistent before making the decision to reassign the packet flow to a new path, thereby avoiding reassignment for temporary or transient degradations.

Upon determining at operation 604 that the instantaneous flow rate is not less than the average flow rate (i.e., the i-rate is not degraded), then method 600 may proceed to an operation 608. At operation 608, a counter is incremented. As shown in FIG. 6, at operation 608, a counter is incremented by an amount (i.e., current counter value X is previous counter value X+1 modulo Y, where Y is a constant value). That is, the ingress TOR switch determines that the instantaneous flow rate is improving, for example, as described in reference to operation 508 of method 500 above.

After operation 608, method 600 includes determining at operation 610 whether or not the counter has reached a value of zero (i.e., counter value X=0). Upon determining at operation 610 that the counter has not reached zero, then method 600 may proceed to operation 612 where the ingress TOR switch keeps the packet flow assigned to the current path. That is, at operation 610 because the counter has not yet reached zero, method 600 determines that the instantaneous flow rate is not yet consistently improving, i.e., the instantaneous flow rate is not greater than the average flow rate more than a predetermined number of times, as indicated by the counter value.

Upon determining at operation 610, however, that the counter value has reached zero after incrementing the counter value at operation 608, then method 600 proceeds to operation 614. That is, the counter value reaching zero at operation 610 after incrementing the counter at operation 608 indicates that the instantaneous flow rate is consistently improving, i.e., the instantaneous flow rate is greater than the average flow rate more than the predetermined number of times, as represented by the counter. In this case, method 600 proceeds to operation 614 where the ingress TOR switch assigns the packet flow to a new path and resetting the counter value to the initial value, as described above. With this arrangement, method 600 also allows ingress TOR switch to verify a consistent improvement to the instantaneous flow rate before making the decision to reassign the packet flow to a new path, thereby avoiding reassignment for temporary or transient improvements.

In addition, in some embodiments, a fast convergence technique may be implemented for a packet flow. According to the fast convergence technique, when a packet flow experiences a large drop in instantaneous flow rate (i-rate) compared to average flow rate (a-rate) (i.e., a difference exceeding a predetermined threshold), the fast convergence technique allows the average flow rate to quickly converge to the instantaneous flow rate. In an example embodiment, the fast convergence technique includes assigning the instantaneous flow rate (i-rate) to the average flow rate (a-rate).

Figure 7:
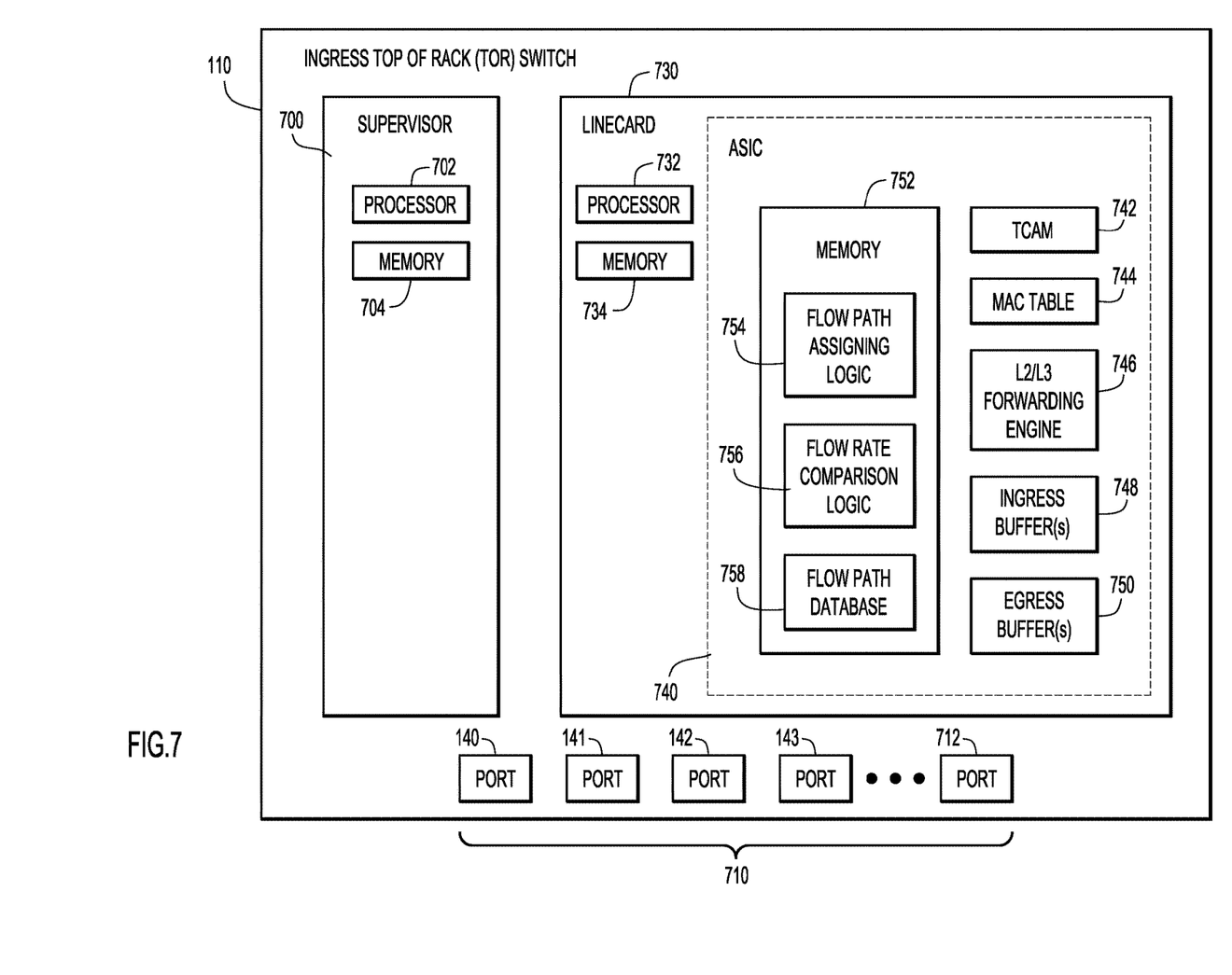
FIG. 7 is a block diagram of a switch for implementing techniques for flow rate based load balancing, according to an example embodiment.

FIG. 7 is a block diagram of a representative ingress leaf/TOR switch (e.g., first TOR switch 110) configured to perform techniques for flow rate based load balancing in spine-leaf network 100, according to an example embodiment. Other leaf/TOR switches may have a similar configuration to perform these flow rate based load balancing techniques. In some embodiments, the ingress TOR switch may include a supervisor module/section 700 and a linecard 730. While one linecard 730 is shown in FIG. 7, it is to be understood that the switch may have multiple linecards. Supervisor 700 may include a processor 702 and a memory 704. The processor 702 may be embodied by one or more microprocessors or microcontrollers. In some embodiments, processor 702 may poll the ingress TOR switch (e.g., first TOR switch 110) regarding the congestion status of packet buffers, including one or more Ingress Buffer(s) 748 and Egress Buffer(s) 750, described below to determine local congestion information associated with one or more ports of a plurality of network ports 710.

Linecard 730 may include a processor 732 and a memory 734. Linecard 730 can also include a ternary content-addressable memory (TCAM) 742, a Media Access Control (MAC) table 744, an L2/L3 Forwarding Engine 746, one or more Ingress Buffer(s) 748 and Egress Buffer(s) 750, and a memory 752. These components may be embodied as a hardware ASIC 740. Various operations of an ingress TOR switch described above may be embodied by instructions stored in memory 752 and executed by ASIC 740. For example, memory 752 may include instructions for implementing one or more of a flow path assigning logic 754, a flow rate comparison logic 756, and/or a flow path database 758 to implement various operations of an ingress TOR switch described above in reference to FIGS. 1-6.

The ingress TOR switch may also include a plurality of network ports 710, including first port 140, second port 141, third port 142, and fourth port 143 of first TOR switch 110, described above, as well as one or more additional ports, for example, represented by an nth port 712. Plurality of network ports 710 may include uplink and/or downlink ports, at which ingress traffic is received at the ingress TOR switch and from which egress traffic is transmitted from the ingress TOR switch. The number of ports shown in FIG. 7 is only by way of example and it should be understood that there may be more or fewer ports on the ingress TOR switch.

According to the principles of the example embodiments described herein, techniques for flow rate based load balancing by an ingress TOR switch may be implemented based on congestion control flow rate adjustments initiated by the transport layer and/or application layer in conjunction with any suitable congestion control mechanism. Whichever mechanism is used, the ingress TOR switch measures or determines flow rate locally to infer global congestion and based on the measured local flow rates (e.g., i-rate and a-rate), the ingress TOR switch may load balance packet flows according the techniques described herein. With this configuration, a dedicated feedback mechanism from the egress TOR switch to the ingress TOR switch is not required.

Additionally, the techniques according to the example embodiments described herein may identify flow congestion due to the TCP ACK path (i.e., from an egress TOR switch to an ingress TOR switch) and determine that reassigning the packet flow to a new path at the ingress TOR switch would not be helpful. As a result, the techniques described herein may benefit from a TCP ACK prioritization mechanism, which would make the TCP ACK flow unlikely to experience congestion, insuring that the flow rate based load balancing decisions are made on the basis of traffic flow congestion in the direction from the ingress TOR switch to the egress TOR switch.

In summary, a method is provided comprising: receiving a packet associated with a packet flow at an ingress top-of-rack switch in a spine-leaf network; determining, from the received packet, identification information for the packet flow, wherein the identification information includes at least a source and a destination associated with the packet flow; based on the identification information, determining an instantaneous flow rate for a first path through the spine-leaf network from the source to the destination, wherein the instantaneous flow rate is determined over a first time period; comparing the instantaneous flow rate for the first path to an average flow rate; and based on the comparison between the instantaneous flow rate to the average flow rate, assigning the packet flow to one of the first path or a second path, wherein the second path is different than the first path.

In another form, a non-transitory computer readable storage media encoded with instructions that, when executed by a processor of an ingress top-of-rack switch in a spine-leaf network, cause the processor to: receive a packet associated with a packet flow; determine, from the received packet, identification information for the packet flow, wherein the identification information includes at least a source and a destination associated with the packet flow; based on the identification information, determine an instantaneous flow rate for a first path through the spine-leaf network from the source to the destination, wherein the instantaneous flow rate is determined over a first time period; compare the instantaneous flow rate for the first path to an average flow rate; and based on the comparison between the instantaneous flow rate to the average flow rate, assign the packet flow to one of the first path or a second path, wherein the second path is different than the first path.

Furthermore, an apparatus is provided comprising: a plurality of network ports configured to receive inbound packets and to send outbound packets in a spine-leaf network; a processor coupled to the plurality of network ports, wherein the processor is configured to: receive a packet associated with a packet flow; determine, from the received packet, identification information for the packet flow, wherein the identification information includes at least a source and a destination associated with the packet flow; based on the identification information, determine an instantaneous flow rate for a first path through the spine-leaf network from the source to the destination, wherein the instantaneous flow rate is determined over a first time period; compare the instantaneous flow rate for the first path to an average flow rate; and based on the comparison between the instantaneous flow rate to the average flow rate, assign the packet flow to one of the first path or a second path, wherein the second path is different than the first path.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving a packet associated with a packet flow at an ingress top-of-rack switch in a spine-leaf network;
   determining, from the packet, identification information for the packet flow, wherein the identification information includes at least a source and a destination associated with the packet flow;
based on the identification information and a flow path database, determining, by the ingress top-of-rack switch, an instantaneous flow rate for a first path through the spine-leaf network from the source to the destination, wherein the instantaneous flow rate is determined over a first time period;
comparing the instantaneous flow rate for the first path to an average flow rate; and
based on comparing the instantaneous flow rate to the average flow rate, assigning the packet flow to one of the first path or a second path, wherein the second path is different than the first path.

2. The method of claim 1, wherein the method further comprises:
upon determining that the instantaneous flow rate is greater than or equal to the average flow rate, assigning the packet flow to the first path.

3. The method of claim 1, wherein the method further comprises:
upon determining that the instantaneous flow rate is less than the average flow rate, assigning the packet flow to the second path.

4. The method of claim 3, wherein the packet flow is assigned to the second path when the instantaneous flow rate is less than the average flow rate by a predetermined value.

5. The method of claim 1, wherein the average flow rate is an exponential weighted moving average based on the instantaneous flow rate.

6. The method of claim 1, wherein the method further comprises:
comparing the identification information from the packet to the flow path database stored at the ingress top-of-rack switch; and
upon matching the identification information to an entry in the flow path database, retrieving the instantaneous flow rate and the average flow rate.

7. The method of claim 6, further comprising:
upon determining that the identification information does not match one of a plurality of entries in the flow path database, creating a new entry in the flow path database.

8. The method of claim 1, further comprising:
storing, at the ingress top-of-rack switch, the instantaneous flow rate and the average flow rate.

9. One or more non-transitory computer readable storage media encoded with instructions that, when executed by a processor of an ingress top-of-rack switch in a spine-leaf network, cause the processor to:
receive a packet associated with a packet flow;
determine, from the packet, identification information for the packet flow, wherein the identification information includes at least a source and a destination associated with the packet flow;
based on the identification information and a flow path database, determine, by the processor of the ingress top-of-rack switch, an instantaneous flow rate for a first path through the spine-leaf network from the source to the destination, wherein the instantaneous flow rate is determined over a first time period;
compare the instantaneous flow rate for the first path to an average flow rate; and
based on comparing the instantaneous flow rate to the average flow rate, assign the packet flow to one of the first path or a second path, wherein the second path is different than the first path.

10. The non-transitory computer readable storage media of claim 9, wherein the instructions further cause the processor to:
upon determining that the instantaneous flow rate is greater than or equal to the average flow rate, assign the packet flow to the first path.

11. The non-transitory computer readable storage media of claim 9, wherein the instructions further cause the processor to:
upon determining that the instantaneous flow rate is less than the average flow rate, assign the packet flow to the second path.

12. The non-transitory computer readable storage media of claim 9, wherein the average flow rate is an exponential weighted moving average based on the instantaneous flow rate.

13. The non-transitory computer readable storage media of claim 9, wherein the instructions further cause the processor to:
compare the identification information from the packet to the flow path database stored at the ingress top-of-rack switch; and
upon matching the identification information to an entry in the flow path database, retrieve the instantaneous flow rate and the average flow rate.

14. The non-transitory computer readable storage media of claim 13, wherein the instructions further cause the processor to:
upon determining that the identification information does not match one of a plurality of entries in the flow path database, create a new entry in the flow path database.

15. An apparatus comprising:
a plurality of network ports configured to receive inbound packets and to send outbound packets in a spine-leaf network on behalf of an ingress top-of-rack switch of the spine-leaf network;
a processor coupled to the plurality of network ports, wherein the processor is configured to:
receive a packet associated with a packet flow;
determine, from the packet, identification information for the packet flow, wherein the identification information includes at least a source and a destination associated with the packet flow;
based on the identification information and a flow path database, determine, by the process, an instantaneous flow rate for a first path through the spine-leaf network from the source to the destination, wherein the instantaneous flow rate is determined over a first time period;
compare the instantaneous flow rate for the first path to an average flow rate; and
based on comparing the instantaneous flow rate to the average flow rate, assign the packet flow to one of the first path or a second path, wherein the second path is different than the first path.

16. The apparatus of claim 15, wherein the processor is further configured to:
upon determining that the instantaneous flow rate is greater than or equal to the average flow rate, assign the packet flow to the first path.

17. The apparatus of claim 15, wherein the processor is further configured to:
upon determining that the instantaneous flow rate is less than the average flow rate, assign the packet flow to the second path.

18. The apparatus of claim 17, wherein the packet flow is assigned to the second path when the instantaneous flow rate is less than the average flow rate by a predetermined value.

19. The apparatus of claim 15, wherein the average flow rate is an exponential weighted moving average based on the instantaneous flow rate.

20. The apparatus of claim 15, wherein the processor is further configured to:
   compare the identification information from the packet to the flow path database stored at the apparatus; and
   upon matching the identification information to an entry in the flow path database, retrieve the instantaneous flow rate and the average flow rate; or
   upon determining that the identification information does not match one of a plurality of entries in the flow path database, create a new entry in the flow path database.

* * * * *